Patented Jan. 22, 1952

2,583,492

UNITED STATES PATENT OFFICE 2,583,492

AQUEOUS SOLUTIONS CONTAINING SOAPLESS DETERGENTS

Frederick J. Pollok, Largs, Scotland, assignor to Imperial Chemical Industries Limited, a corporation of Great Britain No Drawing. Application March 15, 1950, Serial No. 149,904. In Great Britain May 27, 1949

1 Claim. (Cl. 252—161)

The present invention relates to aqueous solutions containing soapless detergents and is particularly concerned with aqueous solutions containing anionic surface-active detergents.

Anionic surface-active soapless detergents lack sufficient dispersing power for removed soil or dirt and are often mixed with a water-soluble sodium carboxymethyl cellulose in order to overcome this deficiency. But heretofore it has not been possible to produce satisfactory stable aqueous solutions of anionic surface-active agents in admixture with quantities of less than 2% of a water-soluble sodium carboxymethyl cellulose.

The object of the present invention is to provide stable aqueous compositions comprising aqueous solutions containing anionic surface-active soapless detergents and a water-soluble alkali metal carboxymethyl cellulose.

It has now been found that it is possible to produce stable aqueous compositions comprising aqueous solutions containing anionic surface-active soapless detergents by the addition to such solutions of a water-soluble alkali metal salt of a carboxymethyl cellulose if the concentration of the surface-active detergent is not above 8 per cent of the weight of the aqueous composition and if the said salt is a crude water-soluble alkali metal salt of carboxymethyl cellulose in admixture with the corresponding alkali metal carbonate and has a degree of substitution lying between 0.7 and 0.8 alkali carboxymethyl groups per anhydro glucose unit of cellulose.

According to the present invention stable aqueous compositions comprising anionic surface-active soapless detergents and a water-soluble alkali metal carboxymethyl cellulose are such that in said compositions the anionic surface-active soapless detergent is in a quantity not above 8 per cent of the weight of the composition and the water-soluble alkali metal carboxymethyl cellulose is a crude water-soluble alkali metal salt of carboxymethyl cellulose in admixture with the corresponding alkali metal carbonate and having above 0.7 and preferably between 0.7 and 0.8 alkali carboxymethyl groups per anhydro glucose unit of cellulose.

According to the present invention the process for the production of a stable aqueous composition comprising an anionic surface-active soapless detergent and a water-soluble alkali metal salt of carboxymethyl cellulose comprises admixing water, an anionic surface-active soapless detergent and a crude water-soluble alkali metal salt of carboxymethyl cellulose in admixture with the corresponding alkali metal carbonate and having above 0.7 and preferably between 0.7 and 0.8 alkali carboxymethyl groups per anhydro glucose unit of cellulose, in such proportions that the soapless detergent is in a quantity not more than 8 per cent of the weight of the composition.

The said crude water-soluble alkali metal salt of carboxymethyl cellulose is preferably sodium carboxymethyl cellulose in admixture with sodium carbonate and having above 0.7 and preferably between 0.7 and 0.8 sodium methyl groups per anhydro glucose unit of cellulose.

Examples of anionic surface-active soapless detergents are the sodium salts of higher alkyl sulphates as for example sodium lorol sulphate, "Teepol X" a compound having as its main component the following ingredient

where $R_1=CH_3$, and $R_2$ is an alkyl radical having carbon atoms lying between $C_{12}$ and $C_{16}$ and "Halvopon LMX" a fatty acid condensation product of Marchon Products Limited, Whitehaven England as both these products contain sodium salts of the higher alkyl sulphates, and the sodium salt of an alkyl aryl sulphonate e. g. "Santomerse D" the trade name for decyl benzene sodium sulphonate.

Aqueous compositions according to the invention and the process for their production are illustrated according to the following examples wherein the parts are parts by weight.

Example 1

Commercially obtainable "Teepol X" liquor is diluted with water so as to form a detergent solution containing 7 per cent of the active ingredient. This solution is thickened to a viscosity of 10 centistokes by the addition of 1 per cent of a crude water-soluble sodium carboxymethyl cellulose having 0.8 carboxymethyl groups per anhydro glucose unit of cellulose and a viscosity of 15 centistokes in 1 per cent (dry weight) solution at 20° C. The said crude water-soluble sodium carboxymethyl cellulose contains 47% sodium carboxymethyl cellulose, 7% sodium carbonate, 26% of a mixture of sodium glycollate and sodium chloride, and has a water content of 20%.

The 7 per cent 'Teepol' solutions with 2% of the crude water-soluble sodium carboxymethyl cellulose has a viscosity of 48 centistokes, with 3% a viscosity of 120 centistokes, and with 4% a viscosity of 260 centistokes.

These solutions are capable of holding finely divided dirt particles in suspension.

*Example 2*

"Santomerse D" is dissolved in water to form a detergent solution containing 5 per cent of the active ingredient. This solution is thickened to a viscosity of 120 centistokes by the addition of 3.0 per cent of the crude water-soluble sodium carboxymethyl cellulose used in Example 1.

These solutions are capable of holding finely divided particles in suspension.

What I claim is:

Detergent compositions of improved dispersing power and stability consisting essentially of an aqueous solution of an anionic surface active soapless detergent in a quantity not above 8% of the weight of the composition and not over 4% of a "crude water-soluble alkali metal carboxymethyl cellulose," said carboxymethyl cellulose having between 0.7 and 0.8 carboxymethyl groups per anhydro glucose unit of cellulose.

FREDERICK J. POLLOK.

REFERENCES CITED

The following references are of record in the file of this patent:

UNITED STATES PATENTS

| Number | Name | Date |
|---|---|---|
| 2,489,848 | Bacon et al. | Nov. 29, 1949 |